United States Patent [19]
Ito

[11] Patent Number: 4,639,749
[45] Date of Patent: Jan. 27, 1987

[54] PRINTING APPARATUS

[75] Inventor: Yoshio Ito, Tokyo, Japan
[73] Assignee: Canon Kabushiki Kaisha, Tokyo, Japan

[21] Appl. No.: 711,179
[22] Filed: Mar. 13, 1985

[30] Foreign Application Priority Data

Mar. 17, 1984 [JP] Japan .................................. 59-51751

[51] Int. Cl.[4] .............................................. G01D 15/14
[52] U.S. Cl. ................................ 346/153.1; 400/119; 101/DIG. 13; 355/3 DR
[58] Field of Search ........................ 346/153.1, 76 PH; 400/119; 101/DIG. 13; 354/14 R; 355/3 DR, 8; 358/300

[56] References Cited

U.S. PATENT DOCUMENTS 4,468,139 8/1984 Hattori ........................... 346/76 PH
4,511,268 4/1985 Marshall ..................... 101/DIG. 13

*Primary Examiner*—Arthur G. Evans
*Attorney, Agent, or Firm*—Fitzpatrick, Cella, Harper & Scinto

[57] ABSTRACT

A printing or recording apparatus wherein a recording head is detachably mountable to the printing apparatus. The head is movable when mounted in the apparatus along a line on recording paper. The recording head includes an image bearing member. The image bearing member carries a developed image which is provided by forming an electrostatic latent image thereon and developing the latent image. The latent image corresponds to the information to be recorded. The recording paper is intermittently advanced. While the recording paper is at rest, the image bearing member rolls on the recording paper along the direction of the line to transfer the developed image onto the recording paper.

10 Claims, 8 Drawing Figures

PRINTING APPARATUS

BACKGROUND OF THE INVENTION

The present invention relates to a printing or recording apparatus wherein recording means serially scans recording paper in the direction transverse to the intermittent feeding thereof and records on the paper.

There are many types of printing apparatus, such as an impact type including a wire dot printer and a daisy wheel printer, and a non-impact type including a thermal printer, a thermal transfer printer and an ink jet printer, which are all implemented into practice. The wire dot printer and daisy wheel printer are advantageous in its high speed of the recording, but are disadvantageous in that they produce noises.

The non-impact type is advantageous in that its produces much less noise than the impact type printer, but is disadvantageous in, that it has to use special paper so that the shelf life of the record is poor. The shelf life of the thermal transfer type is better than the thermal recording type, but the response of the recording in the thermal transfer type is relatively slower, resulting in slow recording than the thermal recording type. Further, the thermal transfer type recording is fastidious about material of the recording paper, particularly the surface roughness of the paper, and therefore, the usable paper is rather limited. The similar limitation applies to the ink jet recording type, that is, if the paper is not suitable the ink smears.

Recently, the demand for high speed recording apparatus which is not particular about the material of the paper, has increased that is, so-called high speed plain paper recording.

SUMMARY OF THE INVENTION

Accordingly, it is a principal object of the present invention to provide a recording apparatus which is substantially free from the above described drawbacks of the prior art devices, and wherein a wide range of materials is acceptable.

It is another object of the present invention to provide a printing apparatus wherein an image corresponding to the information to be recorded is transferred onto the recording paper with certainty.

According to an embodiment of the present invention, the above-described objects are achieved by the printing apparatus wherein an electrostatic latent image is formed in accordance with the information to be recorded and then developed into a visible image, which is transferred onto a recording material by the photosensitive member rolling on the recording material while it rests, the recording material being intermittently movable. The direction of the rolling action of the image bearing member is perpendicular to the intermittent movement of the recording material.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
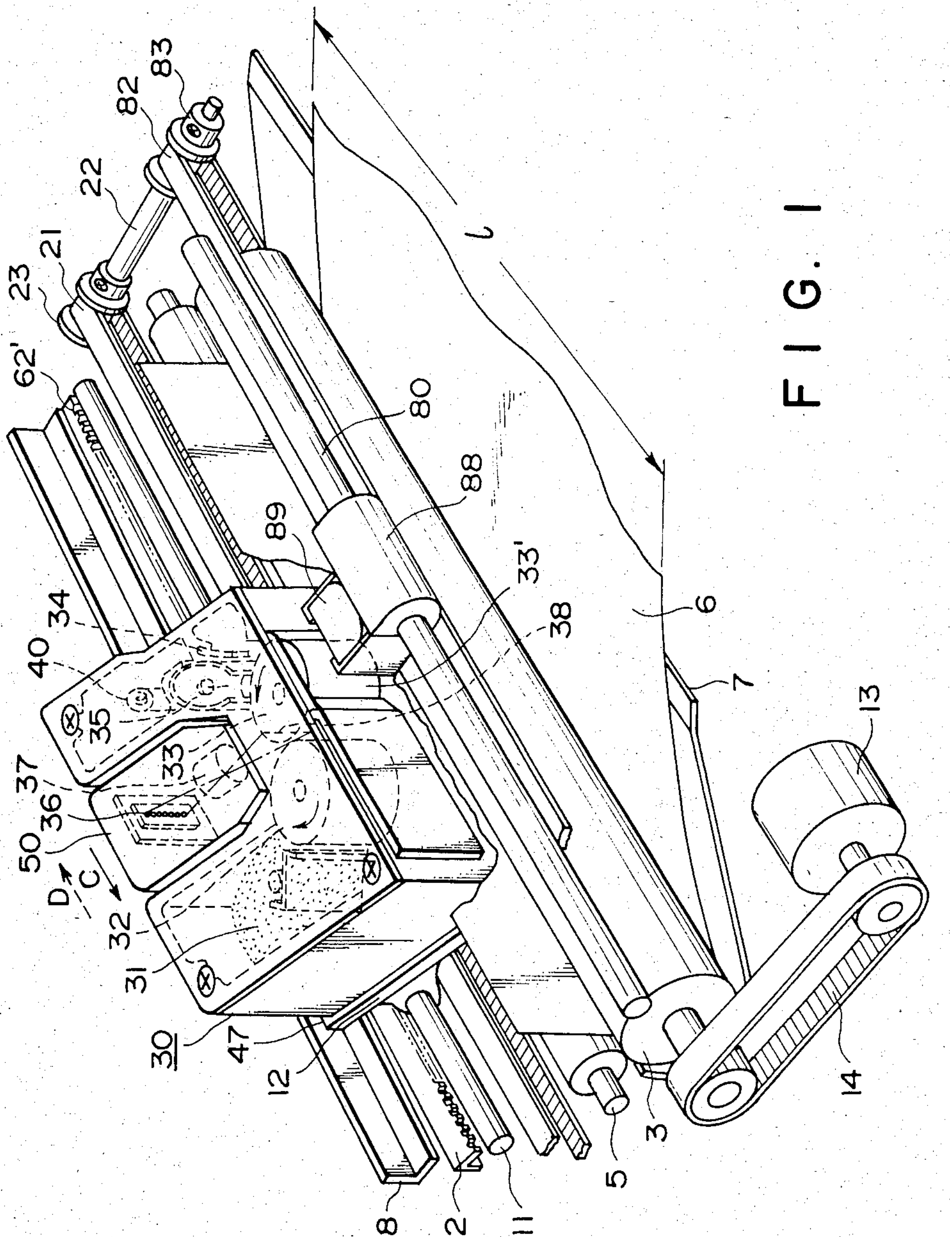
FIG. 1 is a perspective view of the apparatus according to a first embodiment of the present invention.
Figure 2:
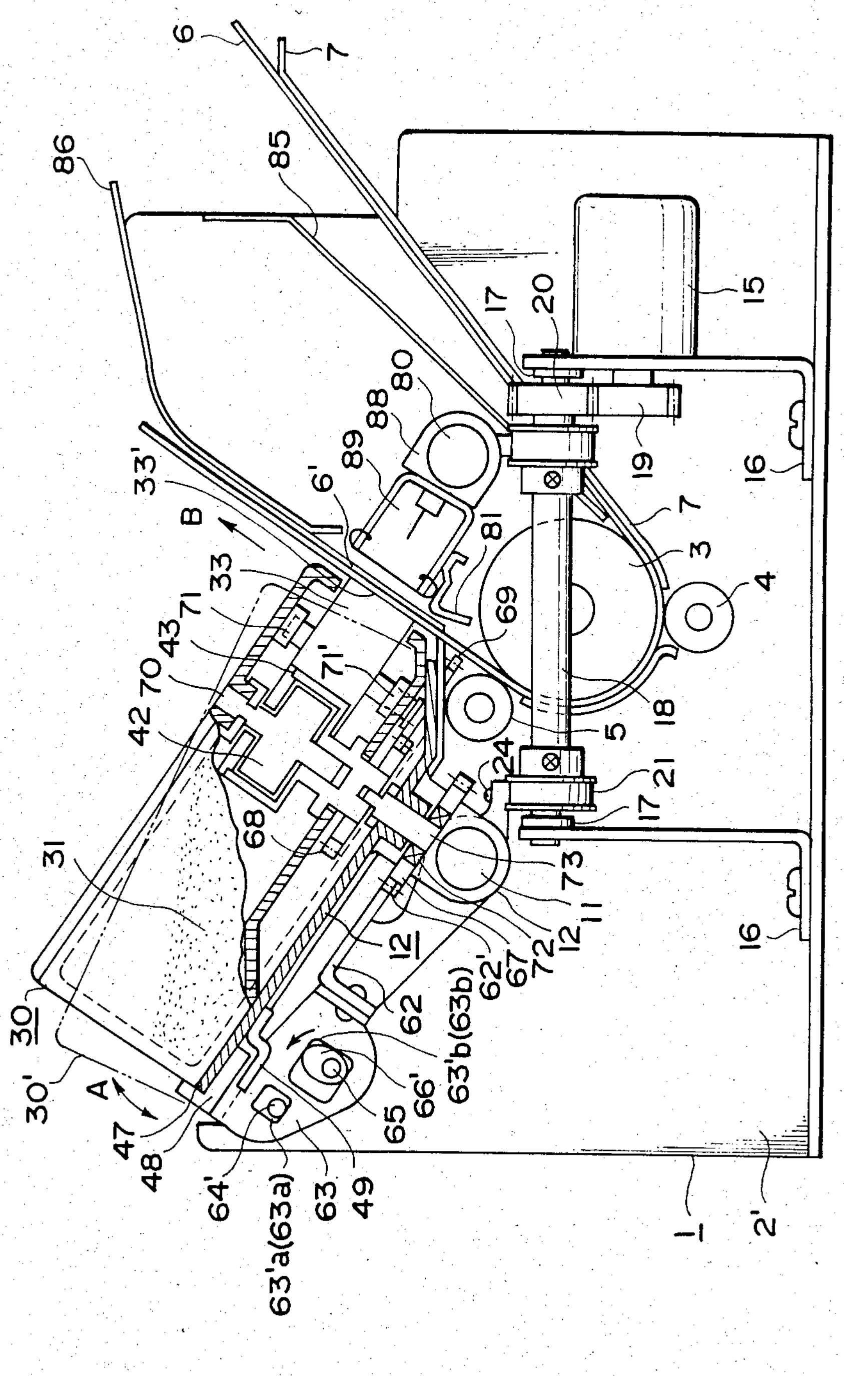
FIG. 2 is a side elevation of the apparatus of FIG. 1.
Figure 3:
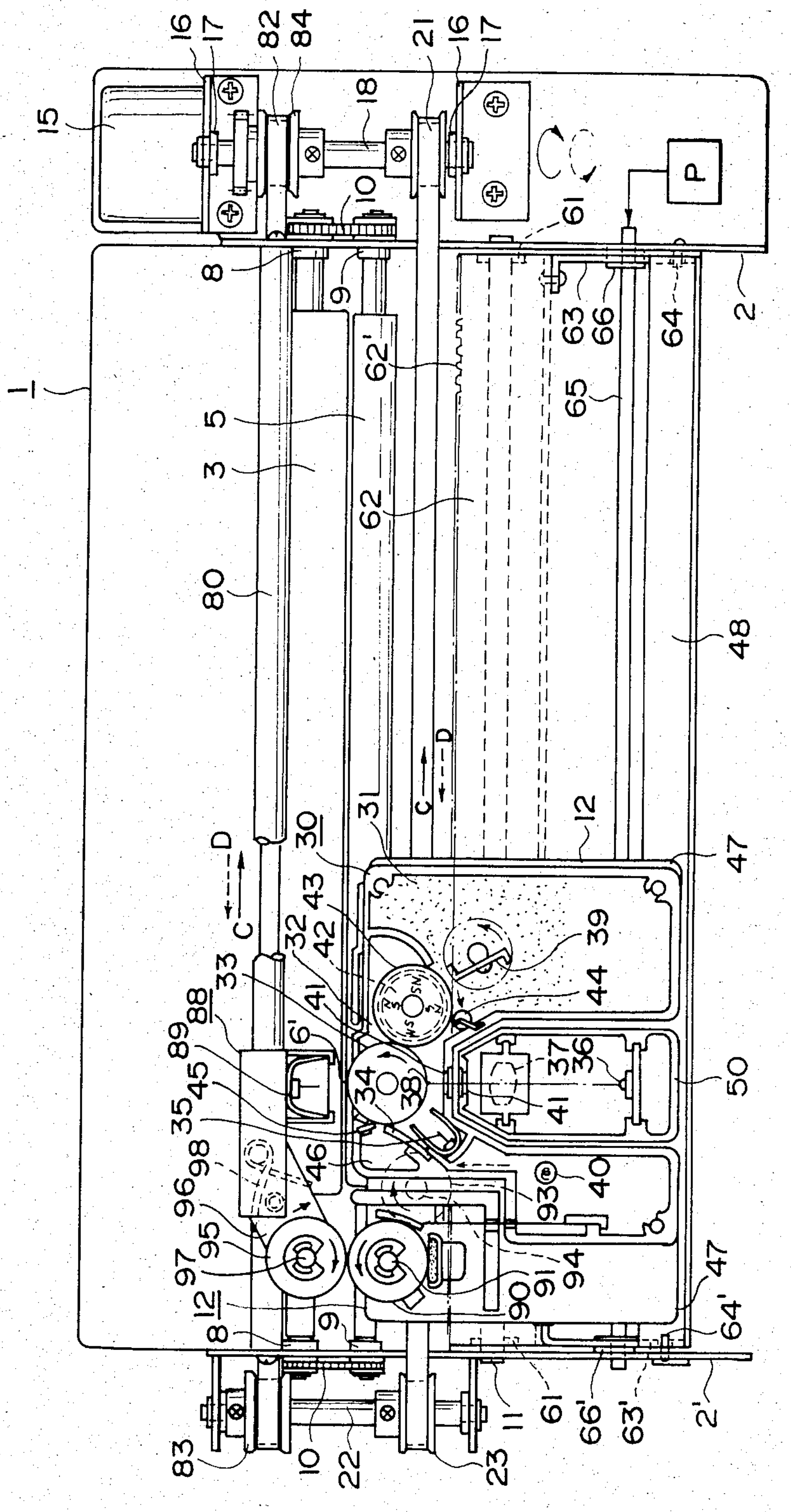
FIG. 3 is a plan elevation of the apparatus of FIG. 1.

Referring to FIGS. 1 through 3, there is shown a printing or recording apparatus according to a first embodiment of the present invention.

First, description will be made with respect to a paper feed mechanism. The apparatus comprises, as shown in FIGS. 1 through 3, a base 1 and side plates 2 and 2′ (omitted in FIG. 1) fixedly mounted to the base 1. Similarly to usual serial printers, a cut sheet or rolled paper 6 for recording is guided by a paper guiding member 7 to the nip formed between the recording paper transporting roll 3 and a first auxiliary roll 4. A second auxiliary transporting roll 5 cooperates with the recording paper feeding roll 3 to feed the recording paper to a printing (recording) station. The rolls 3, 4 and 5 are parallel and are rotatably mounted to the side plates 2 and 2′ through bearings 8 and 9 or the like. To feed the recording paper, a driving motor 13 drives the recording paper feeding roll 3 and the auxiliary rolls 4 and 5 through a gearing or a belt 14 shown in the Figures. FIG. 1 shows the state wherein the paper 6 has been fed to a normal record starting position.

The apparatus includes a carriage 12 for carrying thereon recording means which will be described in detail hereinafter. It is reciprocable toward and away from the side plates 2 and 2′ along a guide rail 11 which is parallel with the paper feeding roll 3 and which is fixedly mounted to the side plates 2 and 2′ at their opposite ends. For moving the carriage 12, a separate and independent driving source (motor) 15 is provided, which drives through gears 19 and 20 a driving shaft 18 rotatably supported by a bearing 17 through frames 16. A driving belt 21 is tensioned in parallel with the axis of the recording paper feeding roll 3 and entrained around a pulley 23 to which a rotatable shaft 22 is fixed at the opposite side of the apparatus to the driving shaft 18. The belt 21 is fixed to the carriage 12 by a fixing element 24. By controlling the rotation of the motor 15, the carriage 12 is reciprocated, thus enabling the printing on a line. In the forward direction, the motor 15 rotates in a direction shown by a solid line arrow to move the carriage 12 in a direction of the arrow C, while in the backward movement, the motor 15 rotates in the opposite direction as shown by a broken line arrow to move the carriage 12 in a direction shown by the arrow D.

Description will be made now with respect to the recording head carried on the carriage 12. The recording head in this embodiment is of a cartridge type, more particularly, a closed or shielded cartridge type. Such a recording cartridge 30 is detachably mountable by a mounting member (not shown) to the carriage 12 which is reciprocable along the guide rail 11. The cartridge 30 contains a photosensitive drum 33 as the image bearing member, around which there are provided charger 35, developing roll 32 and a cleaner 34 as shown. The charger 35 uniformly charge the outer surface of the photosensitive drum 33 while the drum 33 is rotating in the direction of the arrow. The charger 35 is preferably of such a type as to include a fine wire of tungsten or the like insulated in the cartridge or as to include fine needles as the discharging electrode which is capable of effecting electric discharge. A container 50 accommodates an optical system including an array of a light emitting diodes (LED) 36. The LED 36 is selectively actuated in accordance with recording signals to produce light, which is condensed by a lens 37. The light is imaged on the photosensitive drum 33 at a position shown by a reference numeral 38, after the photosensitive drum 33 is uniformly charged by the charger 35. Thus, an electrostatic latent image is formed on the photosensitive drum 33 in accordance with the record signals by the process of electrophotography. The container 50 includes glass windows 41 which are transparent only with respect to the signal light emitted by the LED array 36. Thus, the container 50 accommodating the LED array 36 which functions as input means for the information to be recorded is fixedly mounted on the carriage 12. The cartridge 30 is provided with recess which receives at least that end portion of the container 50 where the glass windows 41 (the light information outlet) exist, so that the container 50 is protected from other light.

The portion of the photosensitive drum 33 bearing the latent image reaches, by the rotation thereof in the direction of the arrow, to the developing station where the developing roll 32 is provided. There, the latent image is visualized with particulated developer 31 on the developing roller 32. The developing roller 32 comprises a rotatable sleeve 43 of a non-magnetic material, a fixed magnet 42 within the sleeve 43, a regulating member 44 for regulating or limiting the thickness of the developer on the sleeve 43 and a stirring member 39. The developer may be two component developer or one component developer. If the one component developer is used, the developing process as disclosed in Japanese Patent Application Publication No. 32375/1983 may preferably be used. A portion of the recording paper 6 is shown partly broken away where it is opposed to the photosensitive drum 33 for purposes of explanation, however, it should be understood that the surface of the photosensitive drum 33 at the portion bearing the developed visual image, is contactable to that side of the recording paper 6 which is to receive the visual image, which image is, therefore, transferred thereonto by an image transfer charger 89 which will be described hereinafter.

After the visualized image is tranferred onto the recording paper 6, the photosensitive drum 33 surface is subjected to operation of the cleaner 34, which removes the residual developer from the drum surface to collect the developer into a container 46. A thin sheet 45 is used for preventing the developer from scattering from the container 46. The photosensitive drum 33 is then acted by a pre-exposure lamp 40 which is effective to erase the residual image so as to prevent occurrence of a ghost image in the subsequent image formation. The pre-exposure lamp 40 illuminates with a small amount of light the surface of the photosensitive drum 33 through a slit shown by broken lines.

In this manner, the photosensitive drum 33 in the cartridge 30 is subjected sequentially to the charging, the light exposure, the development, the image transferring and the cleaning to accomplish an electrophotographic process. The cartridge 30 is detachable from the carriage 12, and therefore, it can be replaced by a fresh cartridge when the developer contained therein has been consumed. The structure may be such that the photosensitive drum 33 is independently exchangeable in consideration of the service life of the photosensitive drum 33.

The carriage 12 will be further described. A rear edge 47 of the reciprocable carriage 12 is supported by a rear guide rail 48, which is slidably confined between the bottom plate of the carriage 12 and a confining member 49 fixed to the bottom. A rack 62 extends to the neighborhood of the side plates 2 and 2', where it is rotatably mounted to the guide rail 11 by the bearings 61 provided at the opposite end portions of the rack 62. To portions of the rack 62, supporting plates 63 and 63' are fixed and extend therefrom to be coupled to the rear guide rail 48. The supporting plates 63 and 63' are each provided with, as shown in FIGS. 2 and 3, openings 63'*a* (63*a*) and 63'*b* (63*b*). Stopper pins 64 and 64' fixed to or integral with the side plates 2 and 2' are engaged with the openings 63*a* and 63'*a*, respectively. Into the other openings 63*b* and 63'*b*, eccentric cams 66 and 66' are engaged, which cams are supported on a cam shaft 65 rotatably mounted to the side plates 2 and 2'. The cam shaft 65 is rotatable by a driving force such as a plunger P or the like through coupling means or cause the cams 66 and 66' to act to the inner surfaces of the openings 63'*b* and 63*b*, thus pivotting all together the rear guide rail 48, the supporting plates 63 and 63' and the rack 62 about the guide rail 11 in the directions shown by arrows A (clockwise or counterclockwise direction). The amount of pivot is determined by the stopper pins 64 and 64' and the openings 63'*a* and 63*a*. By this pivoting action caused by the plunger P, the cartridge 30 on the carriage 12 is capable of assuming a contact position for the image transfer wherein the exposed portion of the drum surface 33' of the photosensitive drum 33 is contacted to the surface of the recording paper 6 extending in the tangential direction of the recording paper feeding roll 3 and the auxiliary roll 5, and is capable of assuming non-contact position where the drum surface 33' is away from the surface of the recording paper 6, as shown by chain lines 30' in FIG. 2. FIG. 2 is a side view seen from the right-hand side of FIG. 3 with the side plate 2 omitted.

The carriage 12 is provided with a gear 67 rotatable with a shaft 73. The gear 67 meshes with the rack 62. To the other end of the shaft 73 of the gear 67, the developing sleeve 43 is coupled so that the sleeve 43 is rotatable together with the gear 67. The magnet 42 within the sleeve 43 is provided with a shaft, one end of which is received by the sleeve 43, and the other end of which is fixed to the frame of the cartridge 30, so that the magnet 42 is fixed. To a portion of the rotatable sleeve 43, a gear 68 is fixed and is meshed with a gear 69 which is fixed to the photosensitive drum 33. The photosensitive drum 33 is supported by bearings 71 and 71' in the cartridge 30. The rotational axis of the photosensitive drum 33 is parallel with the direction B of recording paper advancement so that the generating lines of the outer peripheral of the photosensitive drum 33 is made parallel with the surface of the recording paper.

The function of the gears will be explained. When the driving belt 21, fixedly coupled to the carriage 12, moves in the direction of the solid line arrow C by the action of the motor 15 along the axis of the recording paper feeding roll 3, the gear 67 meshed with the rack gear 62' rotates in the clockwise direction together with movement of the carriage 12. During this, the gear 69 meshed with the gear 68 integrally rotatable with the gear 67 rotates in the opposite direction, i.e. the counter-clockwise direction. Since the gear 69 is directly connected to the photosensitive drum 33, the photosensitive drum 33 rotates in the counterclockwise direction. Thus, the gear 67 provides a speed of linear movement which is completely synchronized with the carriage 12 movement. The gear 69 meshed with the gear 68 integral with this gear 67 has a pitch circle having the diameter equal to the outer diameter of the photosensitive drum 33, whereby the photosensitive drum 33 bearing a developed image to be transferred is completely synchronized with the movement of the carriage 12. Therefore, the photosensitive drum 33, during the transferring operation, rolls on the surface of the recording paper 6 which is maintained at a temporary standstill for receiving the image. That is, the peripheral speed of the drum 33 is equal to the speed of the carriage 12. Further, the outer diameter of the developing sleeve 43 is made substantially equal to the pitch circle diameter of the gear 68 whereby the peripheral speed of the developing sleeve 43 is subtantially equal to the peripheral speed of the photosensitive drum 33 so as to effect a desirable developing operation. However, it is not always necessary that the peripheral speed of the sleeve 43 is equal to that of the photosensitive drum 33.

After the photosensitive drum 33 rolls on one full line of the recording paper, the recording paper 6 is incremented for the recording on the next line. Together with this action, the carriage 12 is preferably moved back in the direction shown by the broken line arrow D to its home position. Further, it is desirable the surface of the photosensitive drum 33 is spaced apart from the surface of the recording paper 6, and that the developing operation, the transfer operation, rotation of the drum 33 and others are stopped, during the backward movement of the carriage 12, whereby it is avoided that the developer particles scatter, that the service life of the drum 33 is decreased or that the service life of the cleaning blade is decreased.

To achieve this, the carriage 12 is constructed in this manner, a one-way clutch 72 is coupled to the gear 67. The clutch 72 engages when the carriage 12 moves in the direction C to allow the rolling action of the photosensitive drum 33 on the recording paper, whereas it disengages when the carriage 12 moves backwardly in the direction D. The clutch 72 may be of a needle type, spring type or electromagnetic type. During the backward movement of the carriage 12, the gear 67 meshed with the rack gear 62' rotates in the counterclockwise direction, but the clutch 72 disengages so that the shaft 73 does not rotate. No rotation takes place in the photosensitive drum 33, the developing sleeve 43 or a stirring member 39 so that they rest during such movement of the carriage 12. The stirring member 39 is connected to a gear not shown (before and) and provided below the rotational shaft thereof, which gear is meshed with gear not shown meshed with the gear 68.

The disengagement of the photosensitive drum 33 from the surface of the recording paper 6 will be described. Upon a signal generated when one line recording in the direction C completes, the driving source such as the plunger P is actuated to rotate the above-described cam shaft 65 in the counterclockwise direction as seen in FIG. 2. This causes the eccentric cam members 66 and 66' on the cam shaft 65 to pivot the rack 62 and the supporting plates 63 and 63' coupled thereto about the guide rail 11 in the counterclockwise direction by the amount corresponding to the eccentricity of the cam members. Also, the rear guide rail 48 fixed to the supporting plates, and therefore, the cartridge 30 pivot altogether in the counterclockwise direction, until the upper ends of the openings **63*a* and 63'*a* abut the stopper pins 64 and 64'**, respectively.

In this manner, the cartridge 30 rotates in the counterclockwise direction about the guide rail 11 so that it is kept at the position shown by the chain lines 30' in FIG. 2. Thus, the photosensitive drum 33 is retracted from the position where it is contacted to the recording paper surface, so as to establish the non-contact position. It should be noted that in this state, the gear 67 is kept meshed with the rack gear 62', thus preparing for the next forward movement. In order to restore the photosensitive drum 33 to the contact position with the recording paper 6, the cam shaft 65 is rotated in the opposite direction, i.e. the clockwise direction.

By achieving the above-described non-contact position, the preparation for the recording on the next line can be started. More particularly, the motor 15 is actuated to rotate in the opposite direction so as to move back the carriage 12 in the direction D until it reaches the home position. As described, during the backward movement of the carriage, the photosensitive drum 33 and the developing sleeve 43 are kept at rest.

If the information to be recorded on a line ends half way in the line, the above-described disengaging operation is performed without delay upon the end signal, and the carriage 12 is moved back to increase the printing efficiency.

Also, if there is one or more lines to be skipped, the paper feeding roll 3 and the auxiliary rolls 4 and 5 are driven by a skipping mechanism which is peculiar to a serial type printer, while the photosensitive drum 33 is kept spaced apart from the recording paper 6. This is effective to highly reduce the total time required for the printing.

In the foregoing, the structures have been described by which the developed image on the photosensitive drum 33 is transferred onto the recording paper 6 by rolling contact of the photosensitive drum 33 to the recording paper 6. To achieve an effective image transfer from the drum 33 to the paper, it is desirable to impart some action from the backside of the recording paper. The image transfer will be described in detail. Generally in an electrophotographic process, corona discharge is applied to the backside of the recording paper in the image transfer operation, and the recording paper is contacted with and moved in synchronism with the photosensitive drum 33 in order to avoid disturbance to the image. In this embodiment, as shown in FIGS. 1–3, guide members 80 and 81 are extended between the side plates 2 and 2' in the space at the backside of the recording paper. The guide members 80 and 81 are parallel to the feeding roll 3. On the guiding members, a second carriage 88 is reciprocably provided. The carriage 88 is coupled to the driving belt 82 which is tensioned between and entrained around timing pulleys 83 and 84 fixed to the above-described shafts 18 and 22. Thus, the driving belt 82, and therefore, the second carriage 88 is driven by the motor 15 which is commonly used to move the carriage 12 (hereinafter will be called "first carriage"). The effective moving length of the second carriage 88 is so determined that it can move through a stroke longer than the effective width of the recording paper. The driving belt 82 extends through a space which does not interfere with the paper guides 7, 85 and 86, more particularly, the upper part of the driving belt 82 or the upper part and the lower part thereof are located in the space existing to the backside of the recording paper 6 so as not to obstract the advancement of the recording paper. Thus, the second carrier 88 is synchronously movable with the first carriage 12 in the same direction in the backside of the transfer station. A small size transfer charger 89 is fixed to the second carriage 88 so as to be opposed to the photosensitive drum 33 in the cartridge 30 on the first carriage 12. The size of one character formed on the photosensitive drum 33 is, for example, approximately 5 mm, which the needle electrode is enough to cover by the corona discharge for enabling the image transfer. As described hereinbefore, the transfer charger 89 is synchronous with movement of the first carriage 12 due to the common driving source to the first carriage 12 and the second carriage 88 whereby the synchronous movement is not damaged.

In this embodiment, the means for fixing the image transferred onto the recording paper is of heat fixing type, as shown in FIG. 3. The fixing means comprises a heating roller 90 rotatable about a shaft 91 on the first carriage 12. Inside the heating roller 90, a heating source is fixedly provided. Although not shown, there is a gear for driving force transmission below the heating roller 90, which gear is meshed with an adjacent gear 93. The gear 93 is rotatable on the shaft 94 which is fixed on the first carriage 12 and is meshed with the rack gear of the rack 62. Therefore, with the first carriage 12 being moved in the direction C by the driving belt 21, the gear 93 rotates in the clockwise direction, and the heating roller 90 rotates in the counterclockwise direction. Again, the peripheral speed of the heating roller 90 is equal to that of the photosensitive drum 33. In other words, the peripheral speed of the roller 90 is the same as the translational speed of the same roller. When the first carrige 12 moves backwardly in the, direction D, the heating roller 90 is spaced apartt from the surface of the recording paper 6 by the above-described cam members 66 and 66' as in the photosensitive drum 33 and the others. Another roller 95 which corporates with the heating roller 90 to form a nip therebetween to receive the recording paper 6, is rotatable together with the heating roller 90 and is rotatably supported on a fixed shaft 97 provided on an arm 96. The arm 96 is swingably supported on the second carriage 88 and is effective with the aid of a spring 98 or the like to urge the roller 95 toward the heating roller 90 at a predetermined pressure.

Thus, the fixing means having a couple of rollers rotates in synchronism with movement of the first and second carriage 12 and 88 on the recording paper. The rollers roll on the front and backside of the recording paper, respectively, while the recording paper being gripped at a lower position. During this rolling action, the rollers do not impart any force to the recording paper in the direction of the carriage movement. In this manner, the rollers roll on the recording paper which is standstill, to fuse and fix the transferred image on the recording paper.

Figure 4:
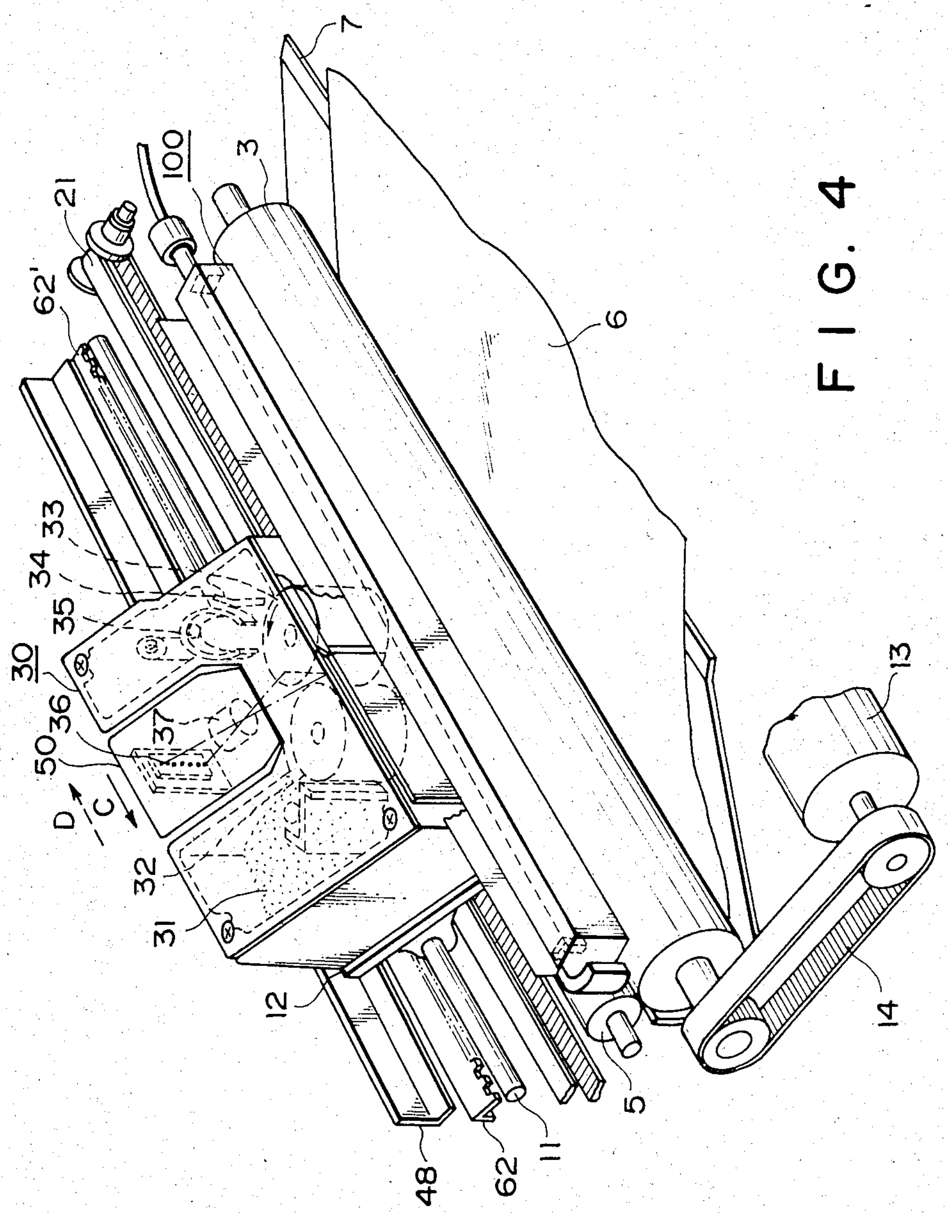
FIG. 4 is a perspective view of the apparatus according to the second embodiment of the present invention.
Figure 5:
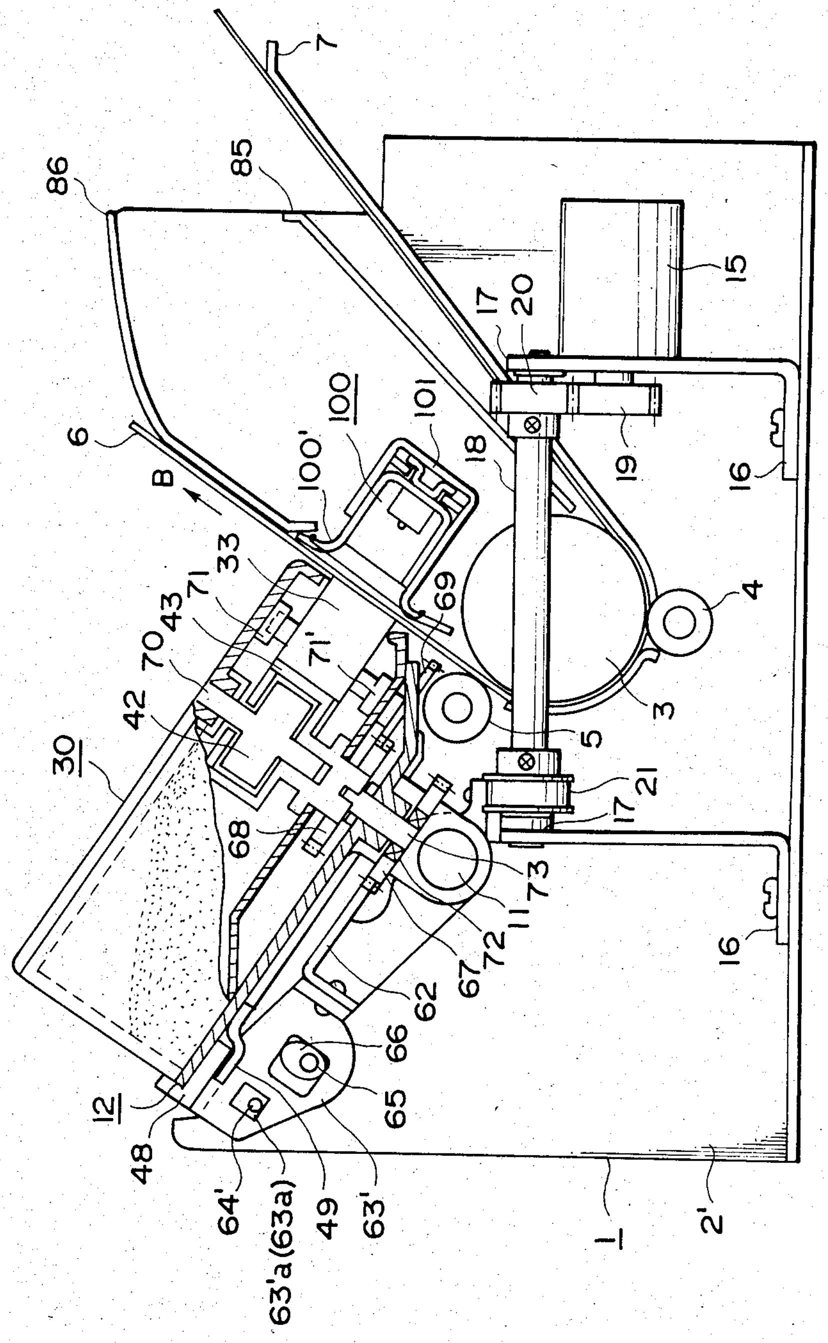
FIG. 5 is a side elevation of the apparatus of FIG. 4.

FIGS. 4 and 5 illustrate another embodiment of the present invention. Since this embodiment is similar to the foregoing embodiment, except for the portions which will be described, the detailed description of the similar portions is omitted for the sake of simplicity by assigning the same reference numerals to the elements having the corresponding functions. In this embodiment a corona charger 100 is used as the transfer charger. It is slidably supported on a guide rail 101 fixedly mounted to the side plates 2 and 2'. The charger 100 is located in a position downstream of the feeding roll with respect to movement of the paper and extends in parallel with the feeding roller 3. The charger 100 is, therefore, parallel with the photosensitive drum 33 which rotates in synchronism with the first carriage 12. A high voltage is applied to the charger 100 to produce corona discharge to the backside of the recording paper so as to transfer the toner image from the photosensitive drum 33 to the recording paper 6 which rests for receiving the image, without disturbance to the image. The high voltage may be applied thereto during the recording paper 6 passing by the charger 100 in a direction perpendicular to the length thereof. Otherwise, it may be applied only when the recording paper feeding roll 3 does not operate for the line feed, namely only during the photosensitive drum rolls on the paper, that is, during the time when the image transfer operation is needed. The charger 100 is opened toward the backside of the recording paper 6 to provide corona transfer region which is large enough to cover that length of the drum 33 which bears the developed image, whereby the corona discharge is effectively applied to a predetermined area in the direction of the line of recording.

As for a usable transfer charger, there is an ion generator as disclosed Japanese Laid-Open Patent Application No. 53537/1979, for example well as the above-described type corona charger using a tungsten wire.

As shown, the guide rail 101 fixedly mounted on a part of the transfer charger 100, may be used as a paper guide for the paper when it is fed by the corporation between the feeding roll 3 and the auxiliary rolls 4 and 5. By doing so, the recording paper can be moved toward the outer surface of the photosensitive drum 33 with higher certainty, so that the image transfer operation is improved. Further, an insulating fine string of e.g. Teflon (trademark) or nylon, to the side of the transfer charger which opens, in the manner that it is inclined with respect to the movement of the paper so as to assist the advancement of the paper. This further improves the transferring action.

Figure 6:
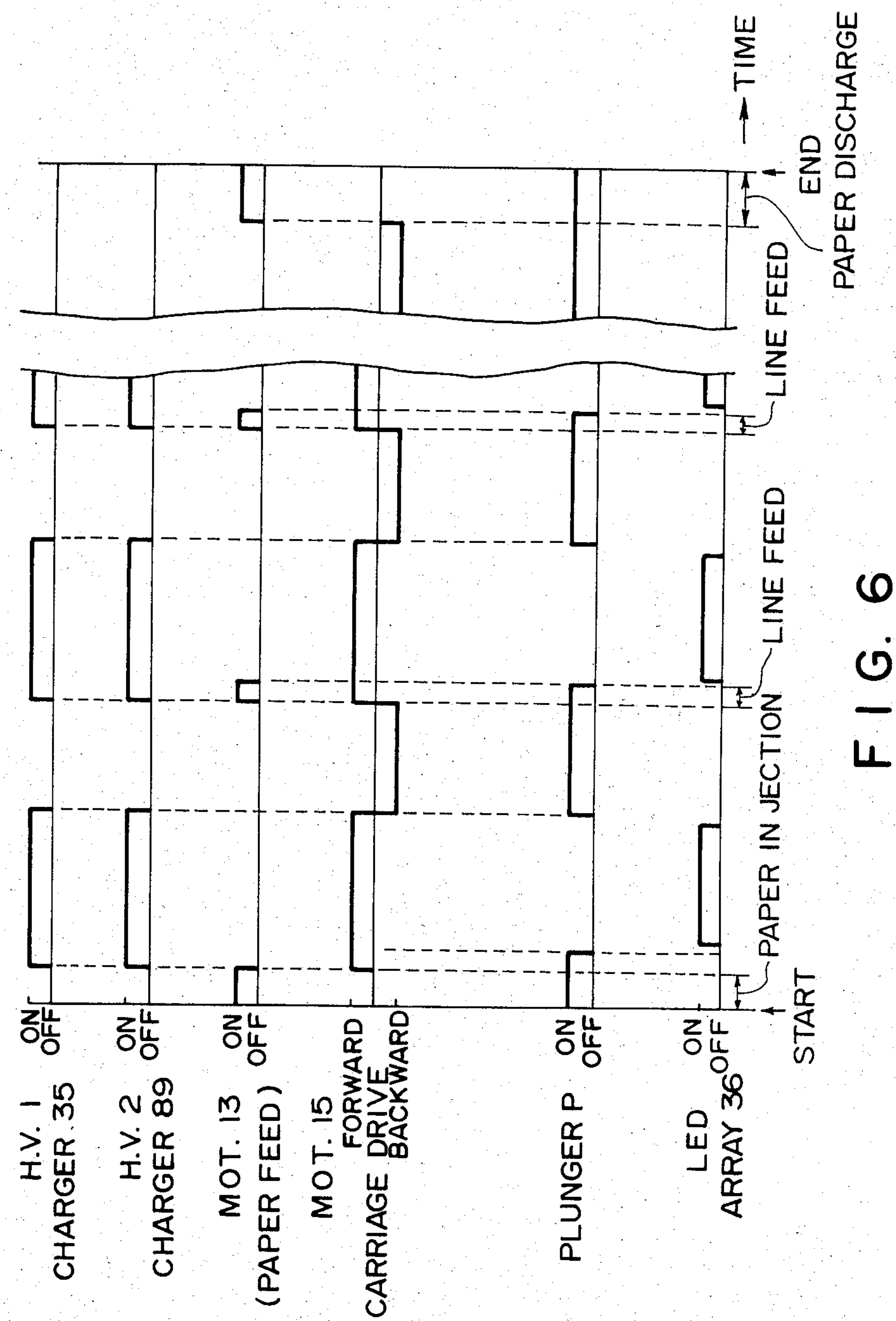
FIG. 6 shows a timing chart illustrating the operation of the apparatus according to the embodiment of the present invention.
Figure 7:
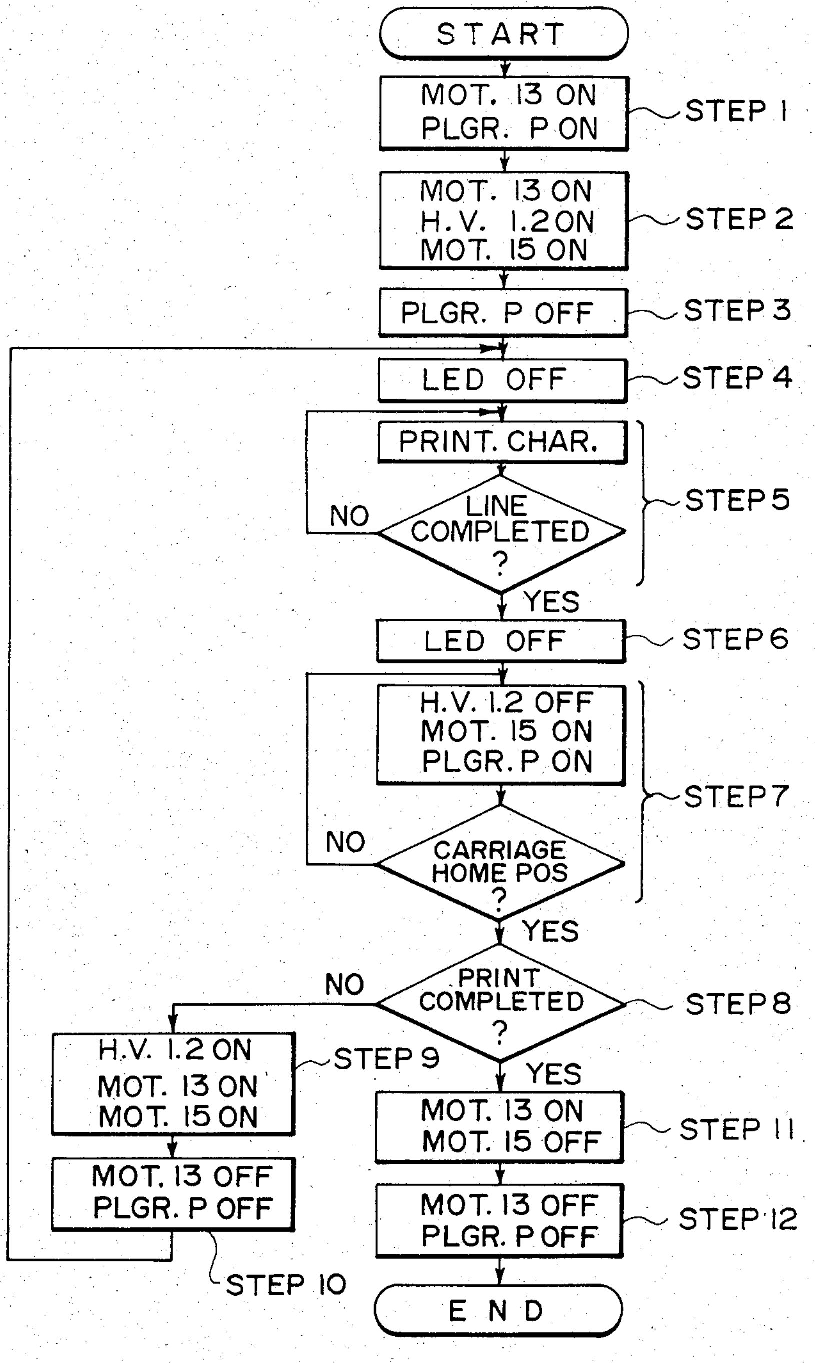
FIG. 7 is a flow chart illustrating the operation of the apparatus according to the embodiment.

Next, the description will be made with respect to sequential operations of the apparatus shown in FIGS. 1-3, in conjunction with FIGS. 6 and 7.

At step 1, the paper is inserted so that it is opposed to the photosensitive drum 33, by actuating the driving motor 13 and feeding the recording paper 6 along the paper guides 7 and 85. Prior to this, the first carriage 12 carrying the cartridge 30 has been restored to the home position and has taken the non-contact position by the plunger P wherein the exposed surface 33' of the photosensitive drum 33 is out of contact with the paper. A detecting means, (not shown) such as a microswitch, detects whether the carriage 12 is in the home position or not. It is preferable that the home position of the carriage 12 is spaced apart from a lateral end of the recording paper 6, for example, the position which is more leftward than that shown in FIG. 3.

After the recording paper 6 is sufficiently injected, the high voltage is applied to the charger 35 and the transfer charger 89 (HV1 and HV2), and the driving motor 15 is actuated to advance the first carriage 12 in the forward direction C, at step 2.

When the first carriage 12 moves through a predetermined distance, the plunger P is deenergized so that the first carriage 12 pivots to such a position that the exposed surface 33' of the photosensitive drum 33 is contacted to the recording paper 6. Thus, the recording position is assumed (step 3).

Upon receiving a signal representative of the information to be recorded, the LED is actuated, at step 4. The LED is actuated to produce light signal in accordance with the signal received thereby. By this, a latent image is formed on the photosensitive drum 33 in accordance with the information to be recorded. Together with the start of the forward movement of the carriage 12, the gear 67, meshed with the rack 62, starts rotating on the rack 62, so as to rotate the developing sleeve 43 and the photosensitive drum 33. Therefore, the latent image formed on the photosensitive drum 33 is visualized by the developer carried on the developing sleeve 43, and the developed image thus provided is advanced to the image transfer station.

The second carriage 88 carrying the transfer charger 89 starts its forward movement in synchronism with the start of the first carriage, whereby those carriages move at the same speed. The photosensitive drum 33 rolls on the surface of the recording paper 6 in the direction perpendicular to the paper feeding, without slipping action with respect to the recording paper, and on the other hand, the transfer charger 89 is kept opposed to the photosensitive drum 33 during the rolling movement of the photosensitive member 33. Becuase of this, the image corresponding to the information to be recorded is transferred onto the recording paper 6 which is temporarily stopped, at step 5.

Upon generation of an end signal of the information to be recorded on the line being printed, the LED is deenergized, at step 6. Further, in response to the end signal, the high voltage supply to the charger 35 and the charger 89 is stopped, and the plunger P is energized to disengage the photosensitive drum 33 from the recording paper 6. Also, the driving motor 15 rotates in the opposite direction to move the carriages 12 and 88 to their home positions in the backward direction D, at step 7. During the backward movement of the first carriage 12, the one way clutch 72 is effective to stop the operation of the process means in the cartridge 30, so as to prevent developer scattering or the service life reduction of the photosensitive drum and so on.

When the next recording or printing is desired after the completion for the line above described, the line feeding is effected by the driving motor by a necessary amount, and then, stopped again for the printing, at steps 8–10.

In response to the signal representative of the information to be recorded, the above-described steps 4–8 are repeated for printing on the line. If one or more lines do not contain any information to be recorded, the recording paper is fed to skip such a line or lines, which is peculiar to the serial type printer, so that the total time required for the printing is significantly reduced.

When the image transfer should start half way on a line, the photosensitive drum 33 and the recording paper 6 are initially kept out of contact while the carriage 12 advances to the record start position. And then, the cam members are operated to contact the photosensitive drum surface to the recording paper which is being held stationary, prior to the image transfer to the recording paper. It is preferable that the high voltage application to the transfer charger only during the necessary period.

Upon completion of the final printing at step 8, the carriages 12 and 88 are moved back to their home positions, and then the driving motor 15 for the carriages is stopped. The driving motor 13 for the recording paper 6 is again actuated to discharge the recording paper 6, and after the discharge, the motor 13 and the plunger P are rendered OFF, at steps 11 and 12.

Figure 8:
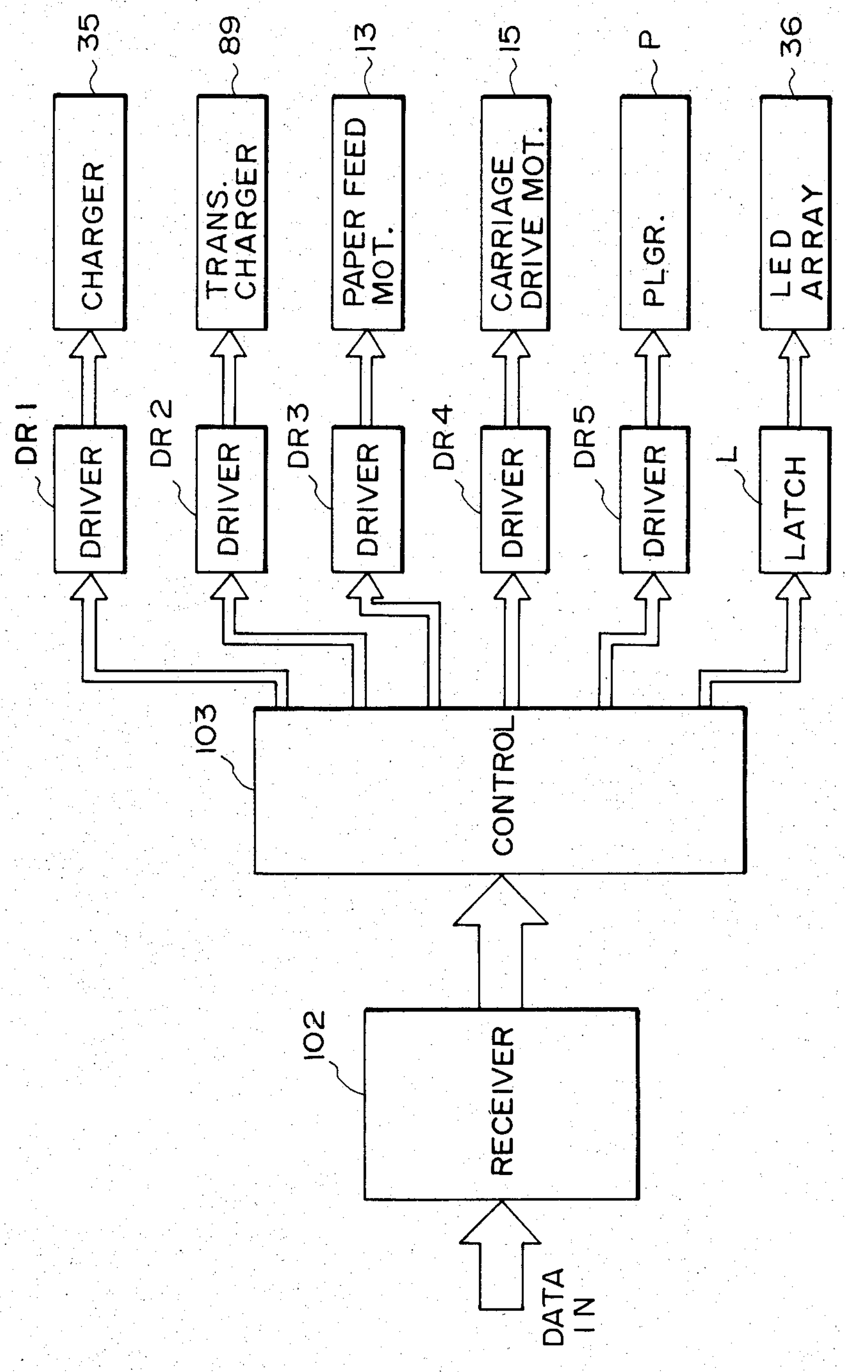
FIG. 8 is a block diagram illustrating the control in the embodiment of the present invention.

FIG. 8 illustrates the control for the apparatus according to the embodiment of the present invention. A receiver 102, upon receiving the external information to be recorded, transmits the information to the controller 103. Upon receiving it, the controller 103 causes and controls the high voltage application to the charger 35 by a driver DR1; the high voltage application to the transfer charger 89 by a driver DR2; the recording paper feeding motor 13 by a driver DR3; the carriage driving motor 15 by a driver DR4; the energization of the plunger by a driver DR5; and the light generation of the LED array by the clutch circuit L.

In the foregoing, description has been made with respect to the embodiments employing an electrophotographic process using a photosensitive drum, which is electrically charged and exposed to a light image to form thereon an electrostatic latent image. However, the manner in which the latent image is formed is not limited to such a process. For example, it is a possible alternative that a drum of a dielectric material is used as an image bearing member, on which a latent image corresponding to the information to be recorded is directly formed by a recording electrode including a number of stylus electrodes arranged in the direction parallel with an axis of the dielectric drum. This or other electrostatic recording process is usable with the present invention.

As described in the foregoing, according to the present invention, a recording or printing apparatus is provided which is advantageous over conventional recording head printers, in that the noises can be minimized, and simultaneously, the recording speed is increased. In addition, the choice of the usable recording paper is made larger than the conventional printers, since the image can be positively transferred from the image bearing member onto plain paper. Since the recording head used with the present invention is reciprocated, the developer is uniformly distributed so as to provide good developing operation.

While the invention has been described with reference to the structures disclosed herein, it is not confined to the details set forth and this application is intended to cover such modifications or changes as may come within the purposes of the improvements or the scope of the following claims.

What is claimed is:

1. A printing apparatus, comprising:

means for intermittently feeding a recording material;

supporting means for detachably supporting a cartridge having a rotatable image bearing member, developing means for developing with developer powder an electrostatic latent image formed on said image bearing member and cleaning means for removing from said image bearing member the developer powder not transferred to the recording material;

means for applying to said image bearing member image information to form the electrostatic latent image thereon, said image information applying means being fixed on said supporting means;

means for reciprocally moving said supporting means in a direction crossing with a direction of the recording material feed;

means for contacting said image bearing member to the recording material to transfer to the recording material a powder image formed on said image bearing member during forward movement of said supporting means, and for disengaging said image bearing member from the recording material;

means for rotating said image bearing member so that it passes through a station where said developing means operates, a station where it is contacted to the recording material and a station where said cleaning means operates, during backward movement of said supporting means; and means for preventing rotation of said image bearing member in a direction opposite to the direction during the backward movement of said supporting means.

2. An apparatus according to claim 1, wherein said developing means operates during the forward movement of said supporting means, while it is inoperative during the backward movement of said supporting means.

3. An apparatus according to claim 1, further comprising image transfer means movable together with and in synchronism with said supporting means.

4. An apparatus according to claim 1, wherein said image information applying means includes an array of light emitting diodes actuable in accordance with a signal to be recorded and a lens for converging onto said image bearing member the light emitted from the light emitting diodes.

5. A printing apparatus, comprising:

means for intermittently feeding a recording material;

supporting means for detachably supporting a cartridge, said cartridge including a rotatable photosensitive member, means for electrically charging said photosensitive member, means for developing an electrostatic latent image formed on said photosensitive member and cleaning means for removing from said photosensitive member the developer not transferred to the recording material, wherein said cartridge is provided with a recess formed with outwardly projected portions, and wherein a light signal to be applied to said photosensitive member passes in the recess;

a container for containing means for forming the light signal in accordance with information to be recorded, said container having a window through which the light signal passes, said container being fixed to said supporting means in such a position that the window and both end portions thereof are covered by the projections forming the recess of said cartridge when it is supported on said supporting means;

means for reciprocally moving said supporting means in a direction crossing with a direction of the recording material feed; and means for contacting said image bearing member to recording material to transfer to the recording material a powder image formed on said image bearing member during forward movement of said supporting means, and for disengaging said image bearing member from the recording material.

6. An apparatus according to claim 5, wherein said window is covered by a transparent member.

7. An apparatus according to claim 5, wherein said light signal forming means includes an array of light emitting diodes emitting light in accordance with information to be recorded.

8. An apparatus according to claim 5, further comprising:

means for rotating said photosensitive member so that it passes through a station where said developing means operates, a station where it is contacted to the recording material and a station where said cleaning means operates, during backward movement of said supporting means; and means for preventing rotation of said photosensitive member in a direction opposite to the direction during the backward movement of said supporting means.

9. An apparatus according to claim 5, wherein said developing means operates during the forward movement of said supporting means, while it is inoperative during the backward movement of said supporting means.

10. An apparatus according to claim 5, further comprising image transfer means movable together with and in synchronism with said supporting means and image fixing means.

* * * * *